US 12,532,870 B2

(12) United States Patent
Phillips et al.

(10) Patent No.: US 12,532,870 B2
(45) Date of Patent: Jan. 27, 2026

(54) HEIGHT ADJUSTABLE STAND FOR POULTRY FEEDERS AND DRINKERS

(71) Applicants: Tyler Phillips, Germantown, MD (US); William Stefany, Gaithersburg, MD (US)

(72) Inventors: Tyler Phillips, Germantown, MD (US); William Stefany, Gaithersburg, MD (US)

(73) Assignee: RentAcoop, LLC, Germantown, MD (US)

( * ) Notice: Subject to any disclaimer, the term of this patent is extended or adjusted under 35 U.S.C. 154(b) by 32 days.

(21) Appl. No.: 18/673,989

(22) Filed: May 24, 2024

(65) Prior Publication Data

US 2025/0359536 A1    Nov. 27, 2025

(51) Int. Cl.
*A01K 39/04*    (2006.01)

(52) U.S. Cl.
CPC .................................... *A01K 39/04* (2013.01)

(58) Field of Classification Search
CPC .... A01K 39/04; F16M 11/04; F16M 2200/00; A47B 91/02; A47B 91/005
USPC ... 248/161, 122, 122.1, 346.5, 346.3, 346.4, 248/346.07, 346.05, 346, 6, 346.01, 248/188.1, 188.2; 119/51.5
See application file for complete search history.

(56) References Cited

U.S. PATENT DOCUMENTS

| | | | | | |
|---|---|---|---|---|---|
| 1,684,925 | A | * | 9/1928 | Perlmutter | F21V 21/06 248/346.07 |
| 3,715,996 | A | * | 2/1973 | Rolfshus | A47C 9/10 D6/692.3 |
| 5,398,898 | A | * | 3/1995 | Bever | A47J 43/18 248/154 |
| 10,562,430 | B1 | * | 2/2020 | Veillon | B60N 3/103 |
| 10,779,655 | B2 | * | 9/2020 | Zaifman | A47C 3/40 |
| 11,472,686 | B2 | * | 10/2022 | Figa | B67B 7/14 |
| 2016/0242385 | A1 | * | 8/2016 | Parness | F16M 11/38 |
| 2019/0216048 | A1 | * | 7/2019 | Uhl | A01K 7/00 |
| 2021/0267389 | A1 | * | 9/2021 | Haller | A47G 7/025 |
| 2022/0071385 | A1 | * | 3/2022 | Hanks | A45C 11/003 |
| 2023/0189754 | A1 | * | 6/2023 | Stone | A01K 5/0114 119/61.57 |
| 2025/0089675 | A1 | * | 3/2025 | Yang | A01K 5/0114 |

* cited by examiner

*Primary Examiner* — Anita M King

(57) ABSTRACT

A height-adjustable stand for holding a feeder and/or drinker apparatus is disclosed. The stand includes a platform that includes a top surface and a bottom surface. The top surface embodies channels, each extending partially towards a center of the platform from an edge of the top surface of the platform. The stand further includes clips, each slidably configured into the corresponding channel. The clips are slidably operable to secure the feeders and/or drinker apparatus mounted on the top surface of the platform. The stand further includes an elevating mechanism operationally attached to the bottom surface of the platform. The elevating mechanism is configured to selectively elevate the platform to a desired height off a surface or floor.

18 Claims, 7 Drawing Sheets

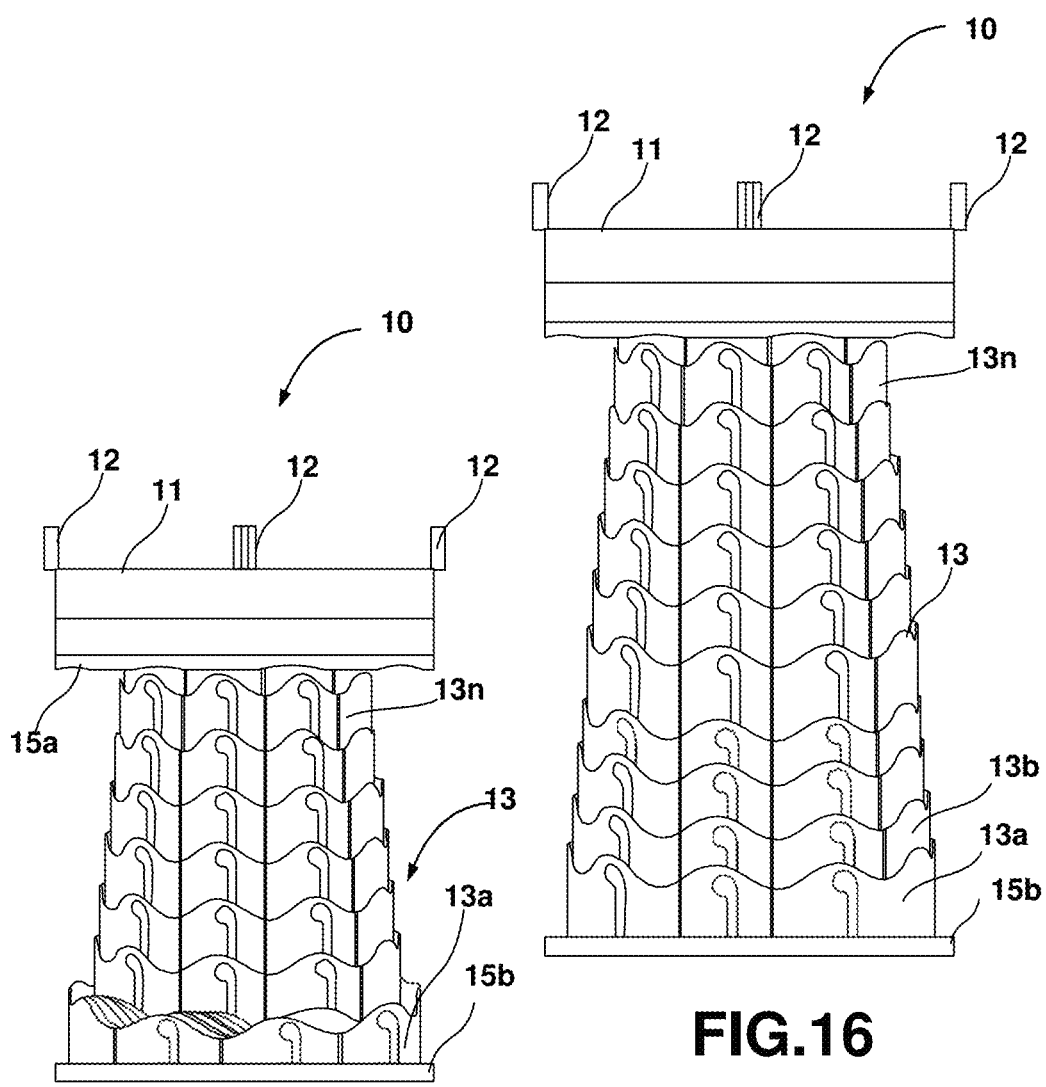
FIG.15
FIG.16
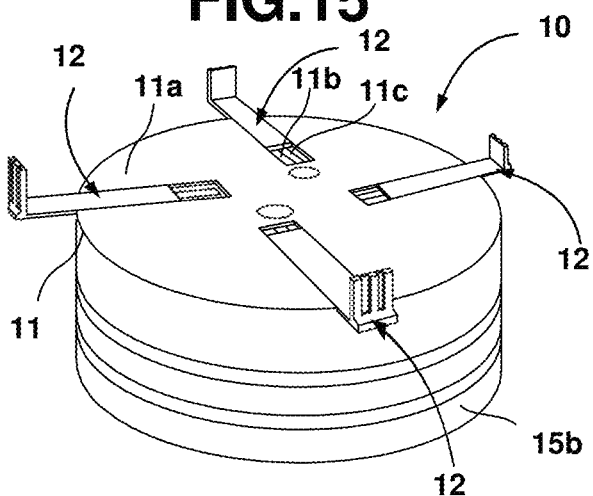
FIG.17

HEIGHT ADJUSTABLE STAND FOR POULTRY FEEDERS AND DRINKERS

TECHNICAL FIELD

The present invention generally relates to stands for poultry feeders and drinkers. More particularly, the present invention relates to a height-adjustable stand to support chicks, chickens, or other similar smaller birds and provide safe retainment to various sizes of feeders and drinkers placed on top of the stand.

BACKGROUND

Many feeder and drinker apparatuses for feeding both large and small-sized poultry such as, for example, chicks and chickens, ducklings, or other small birds are known in the art. It is desirable to be able to make food or water available for the chicks and chickens at appropriate times. It is a widely accepted practice to simply leave a bowl of food or water on a flat surface inside the poultry farm or inside the floor of the brooder where these birds are usually kept. However, it has been observed that while feeding through the feeder or drinker kept on flat surfaces, the chicks and chickens often spill over the food and water that then may mix with their poop and beddings kept aside. This usually leads to a messy environment for the chicks and chickens.

Further, it will be appreciated that food or water kept on the ground level, while may be suitable for a day old chicks, may no longer be suitable at a later growing stage e.g. when the chickens have reached a feather stage because it will be too low in relation to the size of the chickens, who will likely especially when scratching the litter throw up particles of straw, poop, and dirt into the food or water and contaminate the food or water kept in the feeders or drinkers on the ground.

Thus, it is highly desirable to provide a solution in the form of a height-adjustable stand for the poultry feeder and drinker apparatuses that would elevate the feeder and drinker apparatuses off the ground or floor and keep away poop, dirt, and bedding away from the food and water. Further, the height-adjustable stand is suitable for growing chickens and is capable of securely holding feeder and drinker apparatuses of varying sizes.

SUMMARY

Before the present systems and methods, and embodiments are described, it is to be understood that this application is not limited to the particular systems, and methodologies described, as there can be multiple possible embodiments that are not expressly illustrated in the present disclosures. It is also to be understood that the terminology used in the description is for the purpose of describing the particular versions or embodiments only, and is not intended to limit the scope of the present application. Further, it is also to be understood that the terminology if not defined by the present disclosure should be construed as the general or known meaning/definition of the terminology, known to the person skilled in the art.

It is an object of the present invention to provide a height-adjustable stand for poultry feeder and/or drinker apparatuses used for feeding the chickens and other smaller birds. The capability to adjust the height of the stand makes it suitable for growing chickens. The proposed stand is thus suitable for a few days-old chicks (without feathers), small-sized chickens, and larger-sized chickens.

It is an object of the present invention to provide a height-adjustable stand that may lift off feeder and drinker apparatuses from the ground/floor level and that can be used by chicks and chickens of any age, without any risk of contamination of the food or water through dirt, poop and so on.

It is an object of the present invention to provide a height-adjustable stand that can lift off the feeder and drinker apparatuses from the floor of the brooder and accommodate growing chicks to avoid the creation of any mess creation inside the brooder.

It is an object of the present invention to provide a height-adjustable stand that's easy to assemble, easy to adjust, and easy to clean as needed.

It is an object of the present invention to provide a height-adjustable stand that securely holds and supports feeders or drinkers of various sizes. The secure holding of the feeders or drinkers by the stand ensures that the overturning of the feeders or drinkers by the chicks and chickens using it.

Embodiments of the present invention disclose a height-adjustable stand for holding a feeder and/or drinker apparatus. The stand includes a platform comprising a top surface and a bottom surface. The top surface embodies a plurality of channels, each extending partially towards a center of the platform from an edge of the top surface of the platform. The platform is at least circular-shaped, oval-shaped, and polygonal-shaped. The platform further comprises a sidewall extending downward from the top surface. Each of the plurality of channels on the platform comprises at least one guiding rail.

In an embodiment, the stand further includes a plurality of clips, each of the plurality of clips is slidably configured into each of the plurality of channels and is operable to secure the feeders and/or drinker apparatus mounted on the top surface of the platform. Each of the plurality of clips comprises a first arm, and a second arm oriented perpendicular to the first arm. Each of the plurality of clips comprises at least one guide channel located underside the first arm that slides along the at least one guiding rail located inside the channels on the platform to facilitate slidable engagement of the clips into the channels.

In an embodiment, the stand further includes an elevating mechanism operationally attached to the bottom surface of the platform, the elevating mechanism is configured to selectively elevate the platform to a desired height off a surface or floor. In an embodiment, the elevating mechanism comprises a plurality of legs with each of the plurality of legs comprising one or more leg sections. Each of the legs is attached to the bottom surface of the platform and is foldable. In another embodiment, the elevating mechanism comprises a plurality of telescopically nestable members.

In an embodiment, the one or more leg sections include a first leg section, a second leg section, and a third leg section. The first leg section is foldably attached to the bottom surface of the platform between a pair of brackets configured on the platform (at the back surface). The second leg section is foldably attached to an end of the first leg section, and the third leg section is foldably attached to an end of the second leg section. The third leg section is foldable within the second leg section. The second leg section is foldable within the first leg section, and the first leg section foldably rests over the bottom surface of the platform when the stand is not in use or does not require to elevate the feeder or drinker apparatus.

In an embodiment, the telescopically nestable members forming the elevating mechanism are operationally interconnected to achieve the desired height for the stand holding the feeder and/or drinker.

BRIEF DESCRIPTION OF DRAWINGS

In the drawings:

FIG. 15 illustrates a side view of the height-adjustable stand of FIG. 14.

FIG. 16 illustrates a side view of the height-adjustable stand of FIG. 14 in a fully unfolded position.

FIG. 17 illustrates a front perspective view of the height-adjustable stand of FIG. 14 in a fully folded position.

DETAILED DESCRIPTION

Figure 1:
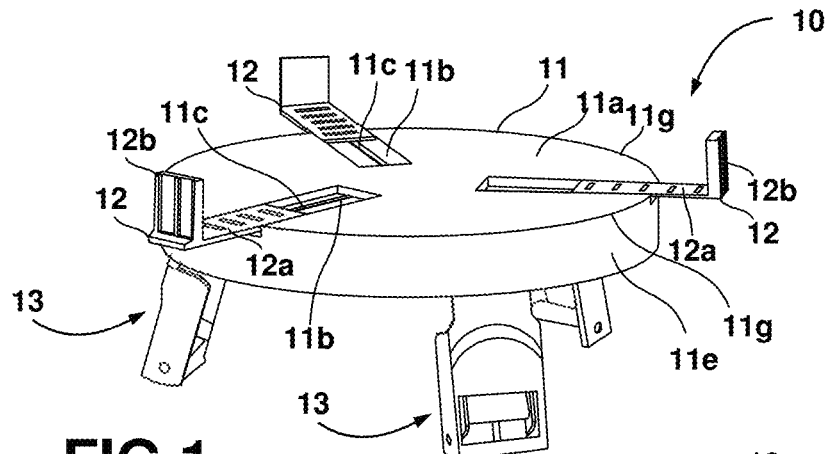
FIGS. 1-3 illustrates front perspective views of a height-adjustable stand in an unfolded position and configured for uses at different height levels, according to an embodiment of the present invention.

Before describing the present invention in detail, it should be observed that the present invention utilizes a combination of components or processes, which constitutes a height-adjustable stand to support chicks and chickens and provide safe securement to various sizes and shapes of feeders and drinkers. Accordingly, the components or processes have been represented, showing only specific details that are pertinent for an understanding of the present invention so as not to obscure the disclosure with details that will be readily apparent to those with ordinary skill in the art having the benefit of the description herein. As required, detailed embodiments of the present invention are disclosed herein; however, it is to be understood that the disclosed embodiments are merely exemplary of the invention, which can be embodied in various forms. Therefore, specific component-level details and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

Some embodiments, illustrating its features, will now be discussed in detail. The words "comprising," "having," "containing," and "including," and other forms thereof, are intended to be equivalent in meaning and be open-ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any methods, and systems similar or equivalent to those described herein can be used in the practice or testing of embodiments, the preferred methods, and systems are now described. The disclosed embodiments are merely exemplary.

References to "one embodiment", "an embodiment", "another embodiment", "one example", "an example", "another example" and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment. The words "comprising", "having", "containing", and "including", and other forms thereof, are intended to be equivalent in meaning and be open-ended in that an item or items following any one of these words is not meant to be an exhaustive listing of such item or items or meant to be limited to only the listed item or items.

The height-adjustable stand for holding a feeder and/or drinker apparatus will now be described with reference to the accompanying drawings, particularly FIGS. 1-17.

FIGS. 1-13 illustrates an embodiment of the height-adjustable stand 10 for holding a feeder and/or drinker apparatus which is usually used to feed the chicks, chickens, or similar small birds.

The height-adjustable stand 10 includes a platform 11. The platform 11 as seen is circular in shape (however may be configured in other shapes such as oval, and polygonal) and includes a top surface 11a and a bottom surface 11f. As can be seen, the top surface 11a includes or embodies multiple channels 11b. Although the platform is illustrated to show three channels 11b, it should be understood that any number of channels (preferably more than two) is possible. Each of the channels 11b preferably extends towards a center of the platform 11 from an edge 11g (circumferential edge) of the top surface 11a of the platform 11. The channels 11b as seen may be rectangular in shape or may be rectangular in shape with rounded corner or some other shapes. In an embodiment, the platform 11 further includes a sidewall 11e extending downward from the top surface 11a or the edge of the top surface 11a.

In an embodiment, each of the channels 11b comprises at least one guiding rail 11c configured within the channel 11b. Although the accompanying figures show the presence of one guiding rail 11c in each of the channels 11b, it may be possible to have more number guiding rails 11c according to other embodiments.

The platform 11 also is shown to incorporate multiple clips 12. Each of the clips 12 include a first arm 12a, and a second arm 12b oriented perpendicular to the first arm 12a substantially formed in an L-shaped configuration. Each of the clips 12 comprises a guide channel (not seen) located underside the first arm 12a. Although the embodiment presented herein embodies one guide channel, it may be possible to have more guide channels underside of the each of the clips (specifically the first arm 12a), according to other embodiments. The number of guiding rails 11c on the channels should be equal to the number of guiding channels present underside the first arm 12a of the clips 12. The shape of the clips (specifically the first arm 12a) should complement the shape of the channels 11b formed on the platform 11. Operationally, each of the clips 12 slides along the at least one guiding rail 11c of the channels 11b to utilizing its guide channel (not seen) to facilitate slidable engagement of the clips 12 into the channel 11b.

Figure 6A:
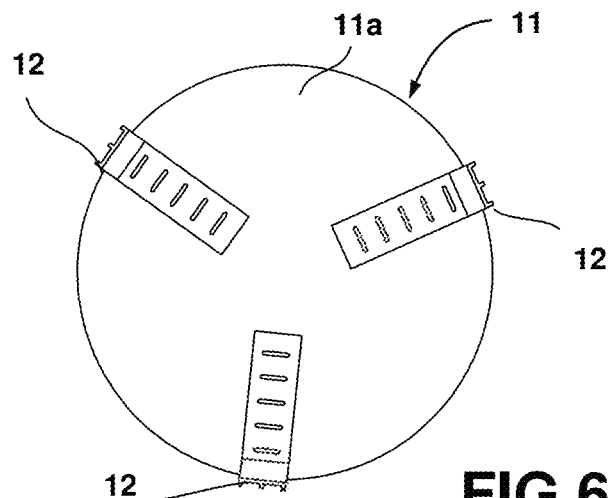
FIGS. 6A-6C illustrates the top views of a platform of the height-adjustable stand of FIG. 1 with support clips slidably adjusted at different positions.
Figure 6B:
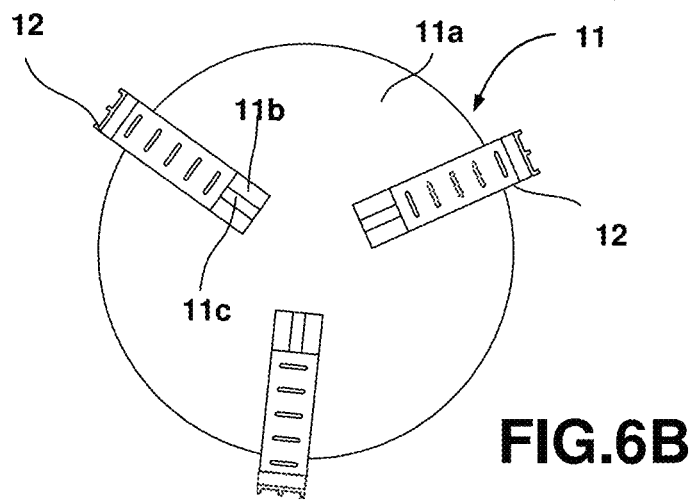
Figure 6C:
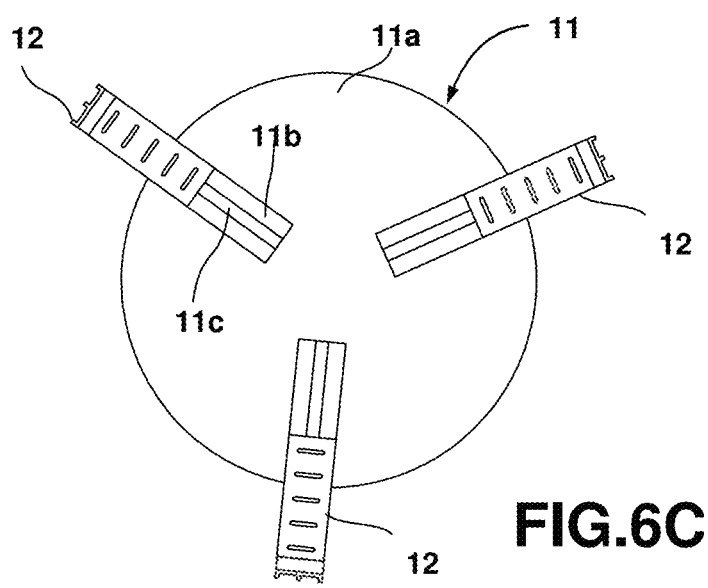

In an embodiment, each of the clips 12 is slidably adjustable (manually) based on the size of the feeder and/or drinker apparatus 20,30 mounted over the platform 11 (as seen in FIGS. 6A-6C). The adjustability of the clips 12 within the channels 11b of the platform 11 ensures that the second arm 12b of the clips 12 limits sliding off of the feeder and/or drinker apparatus 20,30 from the platform 11 as best seen in FIGS. 10-13.

According to an embodiment, the stand 10 is made adjustable in height utilizing an elevating mechanism 13. In an embodiment shown in FIGS. 1-3,5,7-9,10-13, the elevating mechanism 13 is shown to include one or more legs 13. Each of legs 13 including one or more leg sections 13a-13c. In an example shown in the accompanying figures, three legs are shown with each leg comprising three leg sections 13a-13c, however, it should be understood that the stand 10 may include more than three legs with more or a smaller number of leg sections to support the platform 11 and to elevate the platform 11 to a desired height off the ground or surface or off the floor of the brooder (not seen) within which the stand 10 is utilized. Further, each of the legs 13 is attached to the bottom surface 11f of the platform 11 and is foldable as seen in FIGS. 5,7-9.

Figure 2:
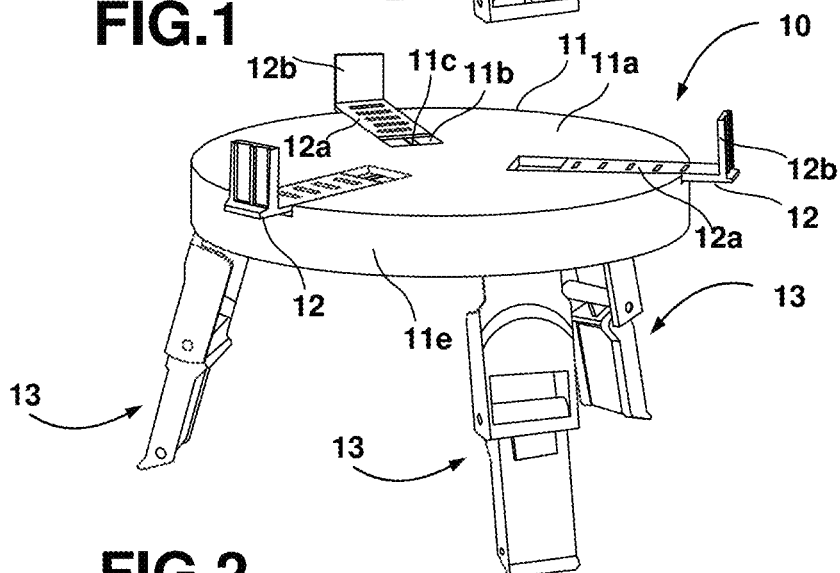
Figure 3:
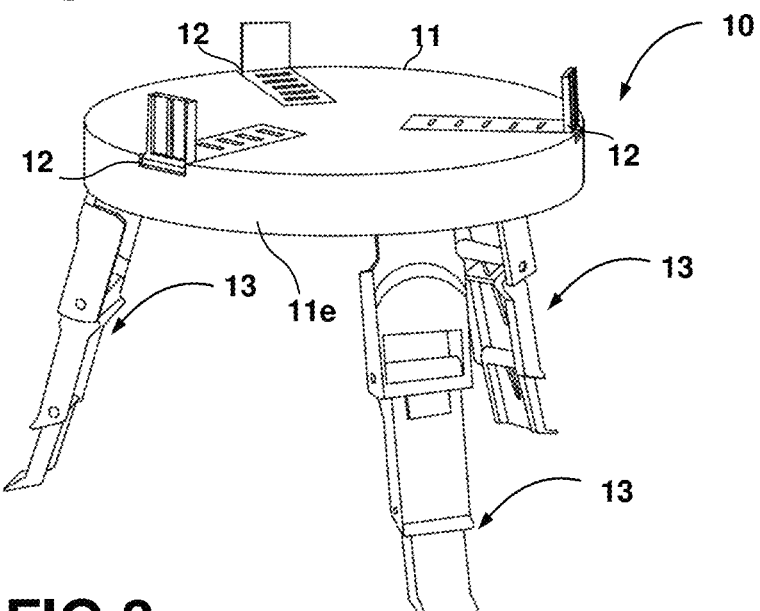
Figure 4:
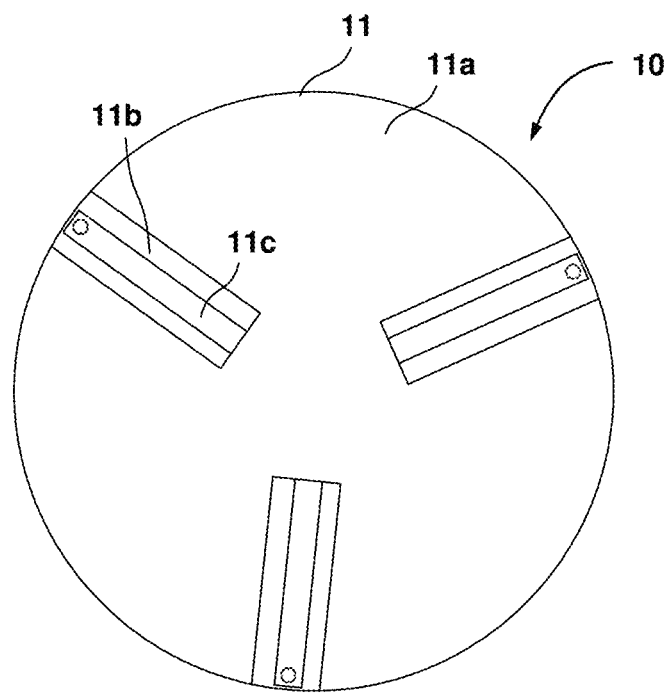
FIG. 4 illustrates a top view of the height-adjustable stand of FIG. 1 without support clips.
Figure 5:
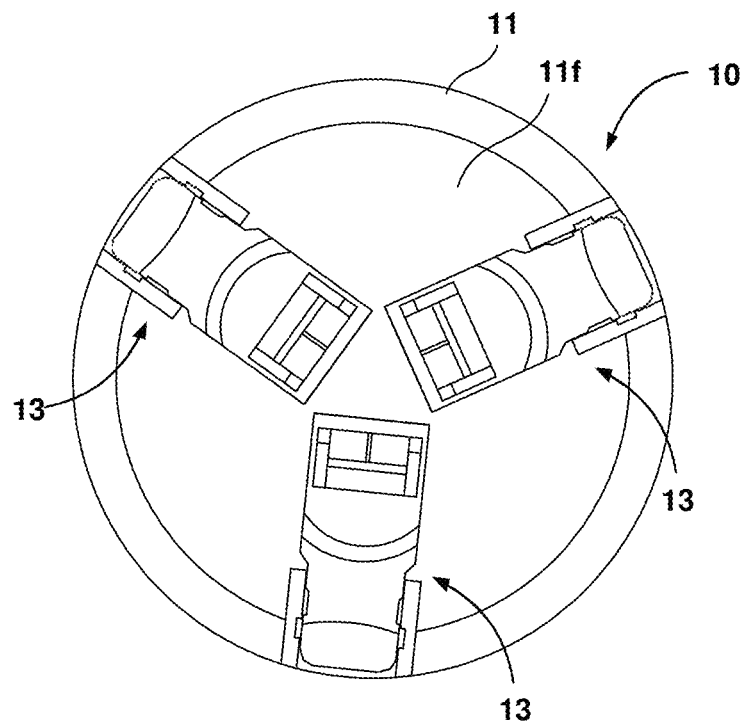
FIG. 5 illustrates a bottom view of the height-adjustable stand of FIG. 1 with the legs in a completely folded position.
Figure 7:
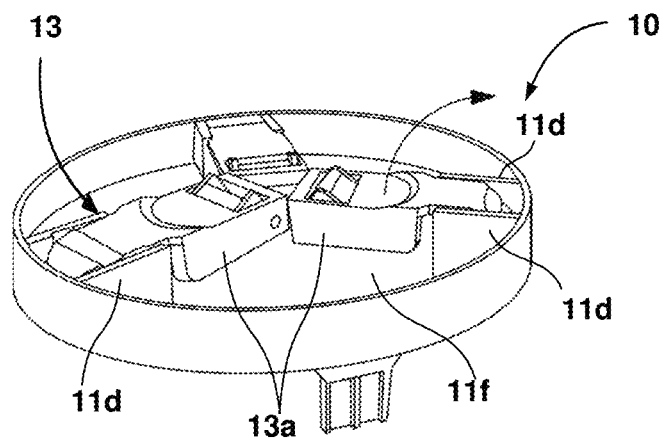
FIG. 7 illustrates a bottom perspective view of the height-adjustable stand of FIG. 1 with the legs in a completely folded position.
Figure 8:
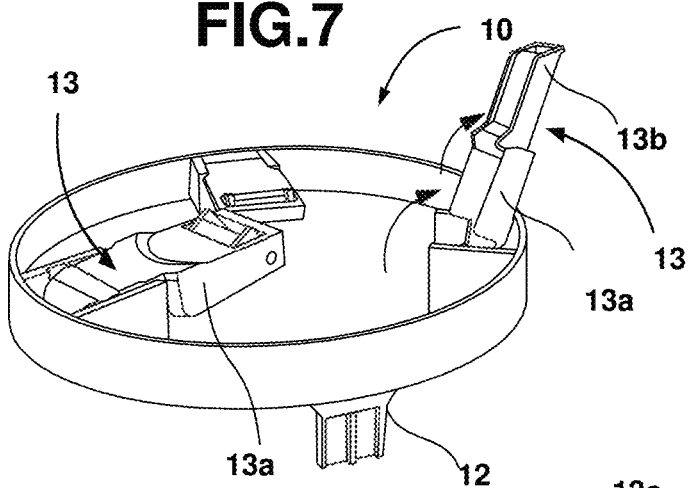
FIGS. 8-9 illustrates the height-adjustable stand of FIG. 7 with one of the legs in a partially unfolded position, and a fully unfoldable position respectively.
Figure 9:
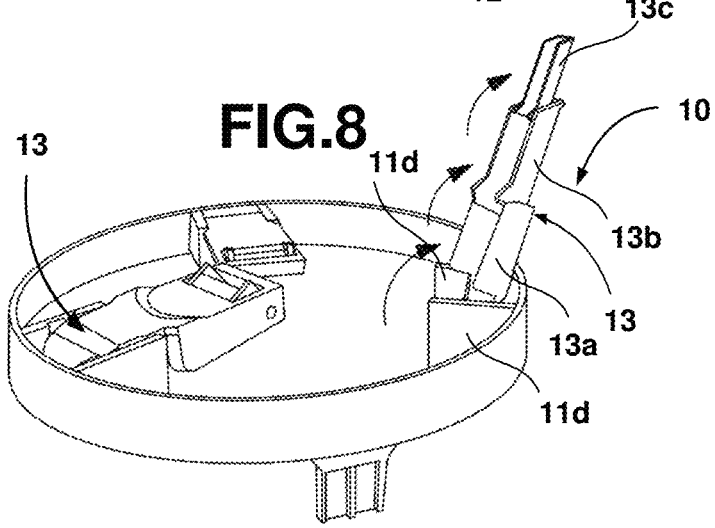

As seen in FIGS. 5,7-9, a first leg section 13a of the one or more leg sections 13a-13c is foldably attached to the bottom surface 11b of the platform 11 between a pair of brackets 11d configured or located on the platform 11, a second leg section 13b of the one or more leg sections 13a-13c is foldably attached to an end of the first leg section 13a, and a third leg section 13c of the one or more leg sections 13a-13c is foldably attached to an end of the second leg section 13b. As seen, the third leg section 13c operationally folds within the second leg section 13b (FIG. 9), the second leg section 13b operationally folds within the first leg section 13a (FIG. 8), and the first leg section 13a folds to rest over the bottom surface 11b of the platform 11 when not in use (FIGS. 5 and 7). The sizes of each leg sections 13a-13c can vary depending upon the size of the stand and the platform 11. The legs 13 may be permanently coupled underside the platform 11 or removably attached underside the platform 11. The leg sections 13a-13c are foldably interconnected using the known mechanism known in the art. FIG. 1 shows the stand 10 with just the first section 13a of the legs 13 in an opened state/retracted state. FIG. 2 shows the stand 10 with just the first section 13a and the second section 13b of the legs 13 in an opened state/retracted state. FIG. 3 shows the stand 10 with the first section 13a, the second section 13b, and the third section 13c in opened states/retracted state.

Figure 10:
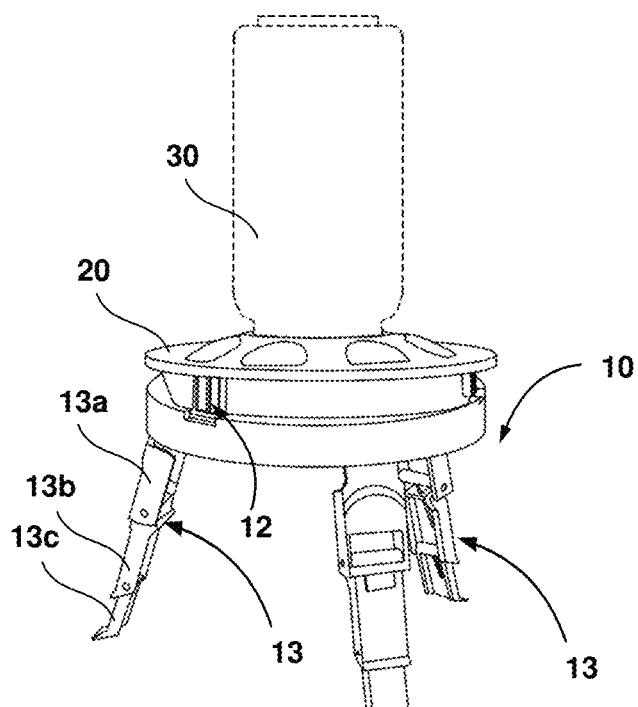
FIGS. 10-13 illustrates the height-adjustable stand of FIG. 1 adjusted at different heights and securely holding feeders and/or drinkers, according to various exemplary embodiments.
Figure 11:
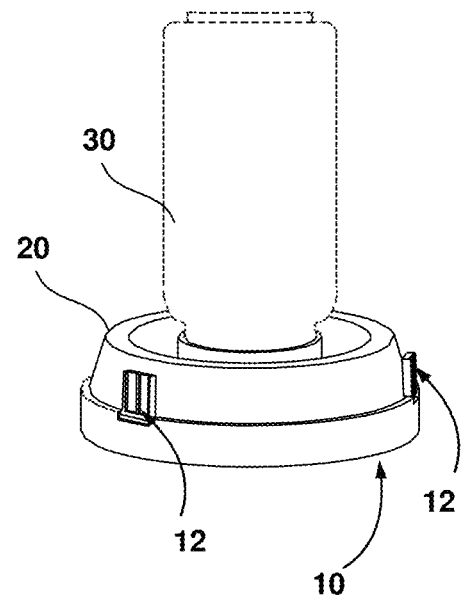
Figure 12:
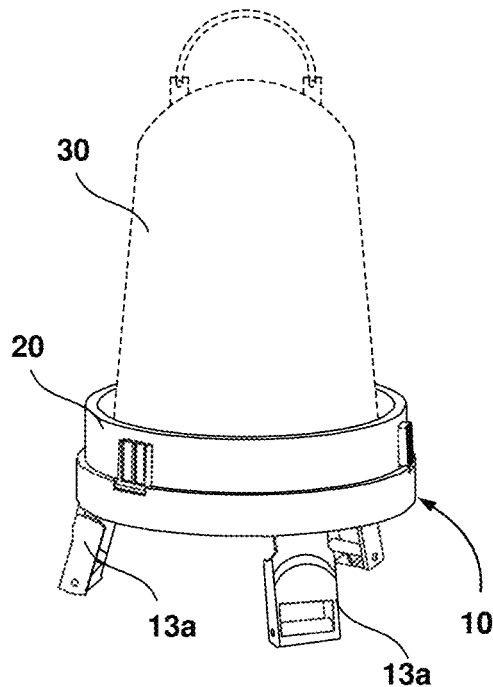
Figure 13:
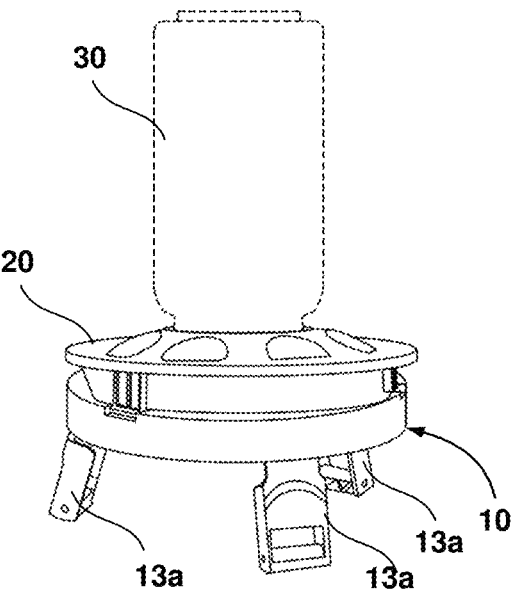

FIG. 10 depicts the stand 10 with all the leg sections 13a-13c in retracted positions. FIG. 10 further shows a feeder 20 and drinker 30 combination mounted on top of the platform 11 of the stand 10. The clips 12 of the stand 10 is seen supporting the feeder 20 from the three sides. The adjusted height of the stand 10 of FIG. 10 may be suitable for growing cheeks or chickens. FIG. 11 Shows the legs 13 in completed folded state similar to shown in FIGS. 5 and 7. However, one should understand that the stand 10 may still be used without the legs 13 being retracted to lift off the feeder 20 and/or drinker 30. This setup may be suitable for small checks or few days old cheeks. It is interesting to note that, even though the legs 13 are not retracted in this configuration, the platform 10 is still lifted off slightly (height equal to thickness of the platform 11) in order to ensure the food and/or water present or kept in the feeder 20 and drinker 30 remains unpolluted and no mesh gets created in the nearby surrounding due to mixing of poop with the water or food. FIGS. 12 and 13 depicts the stand 10 lifted off partially. In particular, FIGS. 12-13 just shows the first leg section 13a unfolded (with other remaining leg sections 13b,13c being folded within the first leg section 13a). In this configuration, the platform 11 is lifted off the ground surface/floor by the height of the first leg section 13a preventing the water or food from mixing with the poop or other pollutants and creating any mess. FIGS. 10 and 13 show one type of feeder 20 in use, whereas FIGS. 11 and 12 show another type of feeder/drinker in use. However, it should be understood that the scope of the present invention is not limited to the design or configuration of the feeder or drinker. Further, the size/diameter of the drinker and/or feeder do not matter for the working of the invention, the platform 11 and clips 12 are responsible for retaining the feeder and/or drinker either the size of the platform or even slightly bigger (in terms of diameter for example) as long as the clips 12 can slide backward and the second arm 12b can retain the feeder and/or drinker in place on the platform 11, without letting it fall of the platform 11.

Figure 14:
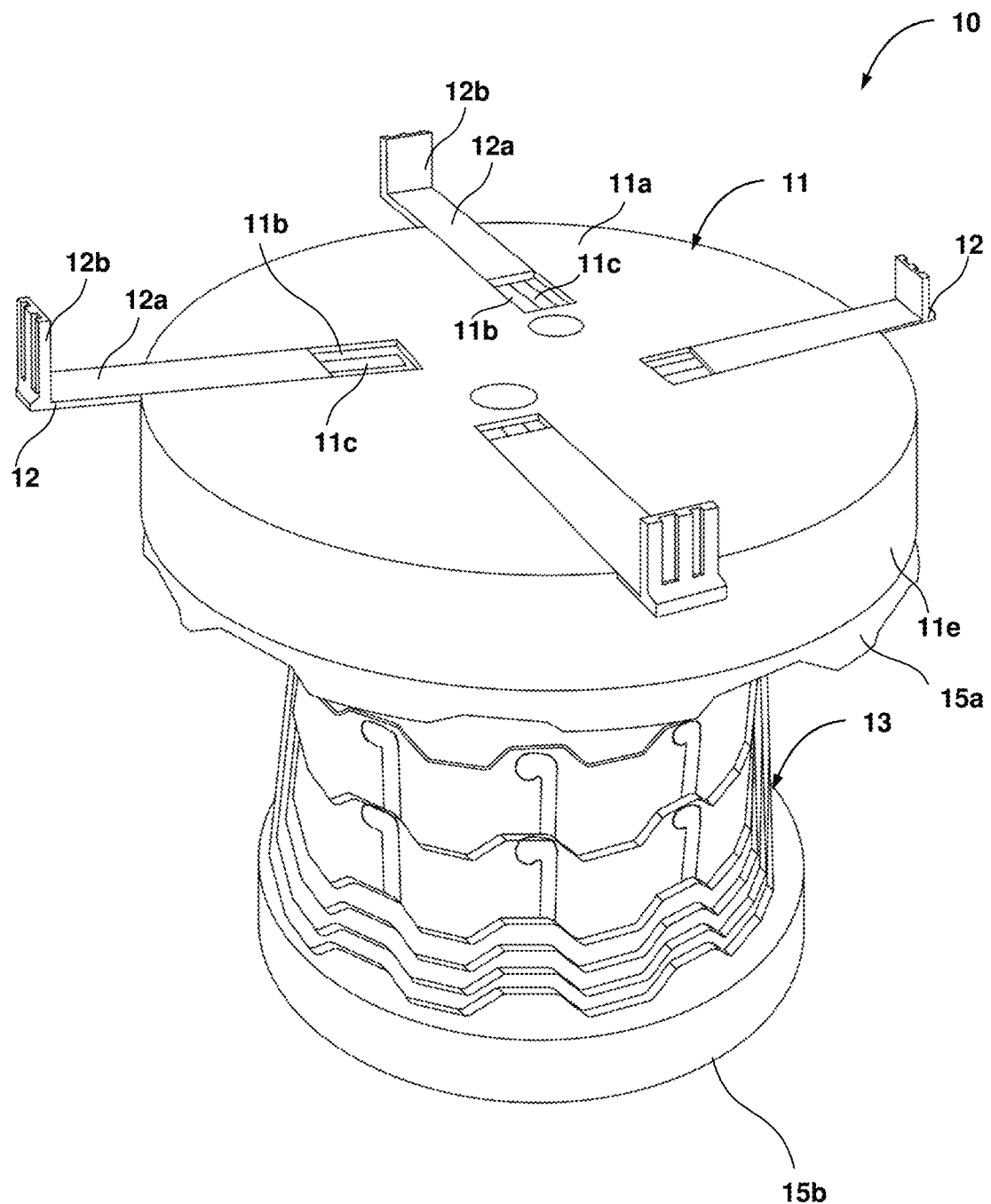
FIG. 14 illustrates a front perspective view of a height-adjustable stand in a partially unfolded position, according to another embodiment of the present invention.

Referring to FIGS. 14-17 illustrate a height-adjustable stand according to another embodiment of the present invention. Particularly, FIG. 14 shows the stand 10 in a partially unfolded position. FIG. 15 illustrates a side view of the height-adjustable stand of FIG. 14. FIG. 16 illustrates a side view of the height-adjustable stand of FIG. 14 in a fully unfolded position. FIG. 17 illustrates a front perspective view of the height-adjustable stand of FIG. 14 in a fully folded position.

In this embodiment, the platform 11 and the associated components and their functionalities such as channels 11b present on the top surface 11a of the platform 11, guide rails 11c located within the channels 11b, clips 12 and the method of their engagement within the corresponding channels 11b remains the same as described above with respect to the first embodiment of the present invention. Thus, the detailed description for these components is omitted herein to keep the detailed description more concise. However, it can be noted that FIGS. 14-17 shows presence of four channels 11b and four clips 12 instead of three shows in FIGS. 1-6 related to first embodiment described above.

The primary difference or distinction of this embodiment over the first embodiment is the elevating mechanism 13 used in the second embodiment. As seen, the elevating mechanism 13 in this embodiment includes a plurality of telescopically nestable members 13a-13n. The telescopically nestable members 13a-13n are operationally interconnected to enable the retracting and collapsing of the plurality of telescopically nestable members 13a-13n. The telescopically nestable members 13a-13n are interconnected between a top plate 15a and a base plate 15b. The top plate 15a is coupled to the underside/bottom surface 11f of the platform 11, whereas the base plate 15b is configured to form a base for the stand 10. The base plate 15b may also embody a gripping feature to provide more stability to the stand 10, thereby to the drinker and feeder placed over the stand's platform 11.

Operationally, the elevating mechanism 13 is configured to be pulled and twisted clockwise to extend and lock the telescopically nestable members 13a-13n at a desired height as may be understood from FIGS. 14-16. The elevating mechanism 13 is configured to be twisted anticlockwise to unlock the telescopically nestable members 13a-13n and fold the adjustable stand 10 as seen in FIG. 17. The nestable members 13a-13n forming the elevating mechanism 13 in this embodiment are interconnected using clasps which are locked and unlocked by twisting the plurality of telescopically nestable members (13a-13n) clockwise, and anticlockwise respectively. Depending upon a number of telescopically nestable members 13a-13n, the height of the stand may vary. The clasps may be implemented in many different forms, for example, each of the telescopically nestable members 13a-13n may have protrusions and slots. The protrusions of one nestable member may engage into the slot of the adjacent nestable members, starting from nestable member 13a to 13n.

The various components of the embodiments of the height adjustable stand 10 of the present invention are similar and interchangeable. It is obvious to the one skilled in the art that the various components, and parts of the height adjustable stand 10 of one embodiment of the present invention could be considered for other embodiments with little or no variation. Further, the material used for the construction of the height adjustable stand 10 and various components such as platform, clips, legs, nestable members and so on may include any material such as but not limited to: metal, plastic, wood, and so on. The term 'desired height' in the context of the present invention refers to a height (from the ground level) suitable for the cheeks, chickens, or other small birds for which the stand may be utilized to make food and water available from feeders and drinkers. The desired height may be as low as the thickness of the platform 11 alone (according to one embodiment), or thickness of the platform 11 and the base plate 15b considered together, or thickness of the platform 11, the top plate 15a and the base plate considered together 15b (according to another embodiment). The maximum height of the stand will depend upon the length of the legs 13 in the completely unfolded position according to one embodiment. According to another embodiment, the maximum height of the stand will depend upon the number and width of each of the nestable members 13a-13n, or the number and width of each of the nestable members 13a-13n and thickness of the top plate 15a and/or the base plate 15b.

It should be understood according to the preceding description of the present invention that the same is susceptible to changes, modifications, and adaptations, and that the said changes, modifications, and adaptations fall within the scope of the appended claims.

What is claimed is:

1. A height-adjustable stand (10) for holding a feeder and/or drinker apparatus (20,30), comprising:
   a platform (11) comprising a top surface (11a) and a bottom surface (11f), the top surface (11a) embodies a plurality of channels (11b), each extending partially towards a center of the platform (11) from an edge (11g) of the top surface (11a) of the platform (11);
   a plurality of clips (12), each of the plurality of clips (12) is slidably configured into each of the plurality of channels (11b) and is operable to secure the feeders and/or drinker apparatus mounted on the top surface (11a) of the platform (11); and
   an elevating mechanism (13) comprising a plurality of legs (13), each of the plurality of legs (13) comprising of one or more leg sections (13a-13c) is foldably attached to the bottom surface (11f) of the platform (11), wherein the elevating mechanism (13) is configured to selectively elevate the platform (11) to a desired height off a surface or floor.

2. The height adjustable stand (10) of claim 1, wherein the platform (11) is at least circular-shaped, oval-shaped, and polygonal-shaped.

3. The height adjustable stand (10) of claim 1, wherein the platform (11) further comprises a sidewall (11e) extending downward from the top surface (11a).

4. The height adjustable stand (10) of claim 1, wherein each of the plurality of clips (12) comprises a first arm (12a), and a second arm (12b) oriented perpendicular to the first arm (12a).

5. The height adjustable stand (10) of claim 4, wherein each of the plurality of clips (12) is slidably adjustable based on the size of the feeder and/or drinker apparatus (20,30) mounted over the platform (11) ensuring the second arm (12b) limit sliding off of the feeder and/or drinker apparatus (20,30) from the platform (11).

6. The height adjustable stand (10) of claim 1, wherein each of the plurality of channels (11b) comprises at least one guiding rail (11c).

7. The height adjustable stand (10) of claim 6, wherein each of the plurality of clips (12) comprises at least one guide channel located underside the first arm (12) that slides along the at least one guiding rail (11c) to facilitate slidable engagement of the plurality of clips (12) into the plurality of channels (11b).

8. The height adjustable stand (10) of claim 1, wherein
   a first leg section (13a) of the one or more leg sections (13a-13c) is foldably attached to the bottom surface (11b) of the platform (11) between a pair of brackets (11d) configured on the platform (11);
   a second leg section (13b) of the one or more leg sections (13a-13c) is foldably attached to an end of the first leg section (13a); and
   a third leg section (13c) of the one or more leg sections (13a-13c) is foldably attached to an end of the second leg section (13b).

9. The height adjustable stand (10) of claim 8, wherein the third leg section (13c) is foldable within the second leg section (13b) and the second leg section (13b) is foldable within the first leg section (13a), and the first leg section (13a) foldably rests over the bottom surface (11b) of the platform (11) when not in use.

10. The height adjustable stand (10) of claim 1, wherein the elevating mechanism (13) comprises a plurality of telescopically nestable members (13a-13n).

11. The height adjustable stand (10) of claim 10, wherein the telescopically nestable members (13a-13n) are operationally interconnected in a way to enable the retracting and collapsing of the plurality of telescopically nestable members (13a-13n).

12. The height adjustable stand (10) of claim 10, wherein the elevating mechanism (13) is configured to be pulled and twisted clockwise to extend and lock the plurality of telescopically nestable members (13a-13n) at the desired height.

13. The height adjustable stand (10) of claim 10, wherein the plurality of telescopically nestable members (13a-13n) forming the elevating mechanism (13) are interconnected using clasps which are locked and unlocked by twisting the plurality of telescopically nestable members (13a-13n) clockwise, and anticlockwise respectively.

14. The height adjustable stand (10) of claim 10, wherein the elevating mechanism (13) is configured to be twisted anticlockwise to unlock the plurality of telescopically nestable members (13a-13n) and fold the adjustable stand (10).

15. A height-adjustable stand (10) for holding a feeder and/or drinker apparatus (20,30), comprising:
- a platform (11) comprising a top surface (11a) and a bottom surface (11f), the top surface (11a) embodies a plurality of channels (11b), each extending partially towards a center of the platform (11) from an edge (11g) of the top surface (11a) of the platform (11);
- a plurality of clips (12), each of the plurality of clips (12) is slidably configured into each of the plurality of channels (11b) and is operable to secure the feeders and/or drinker apparatus mounted on the top surface (11a) of the platform (11);
- an elevating mechanism (13) comprising a plurality of legs (13), each of the plurality of legs (13) comprising of one or more leg sections (13a-13c) is foldably attached to the bottom surface (11f) of the platform (11), wherein the elevating mechanism (13) is configured to selectively elevate the platform (11) to a desired height off a surface or floor; and
- wherein, a first leg section (13a) of the one or more leg sections (13a-13c) is foldably attached to the bottom surface (11b) of the platform (11) between a pair of brackets (11d) configured on the platform (11); a second leg section (13b) of the one or more leg sections (13a-13c) is foldably attached to an end of the first leg section (13a); and a third leg section (13c) of the one or more leg sections (13a-13c) is foldably attached to an end of the second leg section (13b).

16. The height adjustable stand (10) of claim 15, wherein the third leg section (13c) is foldable within the second leg section (13b) and the second leg section (13b) is foldable within the first leg section (13a), and the first leg section (13a) foldably rests over the bottom surface (11b) of the platform (11) when not in use.

17. A height-adjustable stand (10) for holding a feeder and/or drinker apparatus (20,30), comprising:
- a platform (11) comprising a top surface (11a) and a bottom surface (11f), the top surface (11a) embodies a plurality of channels (11b), each extending partially towards a center of the platform (11) from an edge (11g) of the top surface (11a) of the platform (11);
- a plurality of clips (12), each of the plurality of clips (12) is slidably configured into each of the plurality of channels (11b) and is operable to secure the feeders and/or drinker apparatus mounted on the top surface (11a) of the platform (11);
- an elevating mechanism (13) comprising a plurality of telescopically nestable members (13a-13n) is operationally attached to the bottom surface (11f) of the platform (11), the elevating mechanism (13) is configured to selectively elevate the platform (11) to a desired height off a surface or floor; and
- wherein the telescopically nestable members (13a-13n) are operationally interconnected in a way to enable the retracting and collapsing of the plurality of telescopically nestable members (13a-13n).

18. The height adjustable stand (10) of claim 17, wherein the plurality of telescopically nestable members (13a-13n) forming the elevating mechanism (13) are interconnected using clasps which are locked and unlocked by twisting the plurality of telescopically nestable members (13a-13n) clockwise, and anticlockwise respectively.

* * * * *